United States Patent

Kubo

[11] Patent Number: 4,625,464
[45] Date of Patent: Dec. 2, 1986

[54] PIPE PROCESSING DEVICE

[76] Inventor: Tetsushi Kubo, 861, Hirata, Ichihara-shi, Chiba-ken, Japan

[21] Appl. No.: 749,403

[22] Filed: Jun. 27, 1985

[30] Foreign Application Priority Data

Aug. 13, 1984 [JP] Japan .................... 59-123904[U]
Feb. 16, 1985 [JP] Japan .................... 60-28921

[51] Int. Cl.⁴ .......................................... B24B 19/00
[52] U.S. Cl. ........................... 51/241 B; 82/4 C; 82/38 R; 51/170 PT; 30/92
[58] Field of Search ........................ 30/92-97, 30/101, 102; 82/4 C, 38, 39; 408/104-106; 51/170 PT, 290, 241 B, 241 S, 241 R, 103 R; 125/14

[56] References Cited

U.S. PATENT DOCUMENTS

| | | | |
|---|---|---|---|
| 801,866 | 10/1905 | Headson | 30/102 |
| 1,727,225 | 9/1929 | Acres, Jr. | 30/96 |
| 2,247,344 | 6/1941 | Fuglie et al. | 51/241 B |
| 2,755,609 | 7/1956 | Sylvester | 51/241 B |
| 2,870,536 | 1/1959 | Lutsker | 30/102 |
| 2,914,891 | 12/1959 | Nix | 51/241 B |
| 3,228,146 | 1/1966 | Rosengarten, Jr. et al. | 51/241 R |
| 3,237,301 | 3/1966 | Wilson | 30/102 |

FOREIGN PATENT DOCUMENTS 56624 10/1890 Fed. Rep. of Germany ........ 30/101

Primary Examiner—Donald R. Schran
Assistant Examiner—James L. Wolfe
Attorney, Agent, or Firm—Toren, McGeady, Stanger, Goldberg & Kiel

[57] ABSTRACT

A pipe processing device for use in cutting and/or chamfering a pipe to be welded where an attaching body is securely held on the outer peripheral surface of the pipe by means of three abutting members mounted in the angularly spaced relation with the position of the abutting member being adjustable by a screw bar and also smoothly moved along the outer peripheral surface of the pipe, which is then cut by means of a cutting wheel vertically for the axial line and if necessary the end of the pipe can be chamfered by means of a chamfering cutter mounted on the device.

8 Claims, 15 Drawing Figures

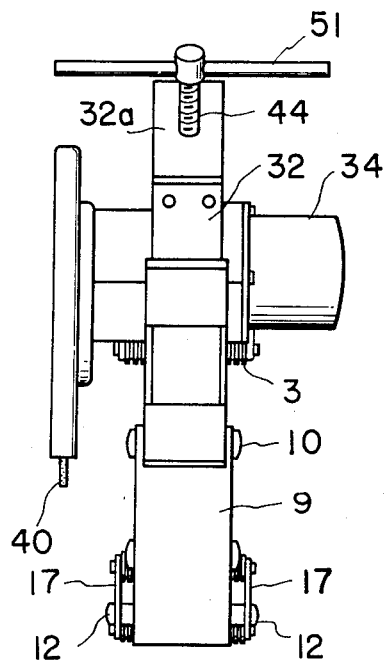
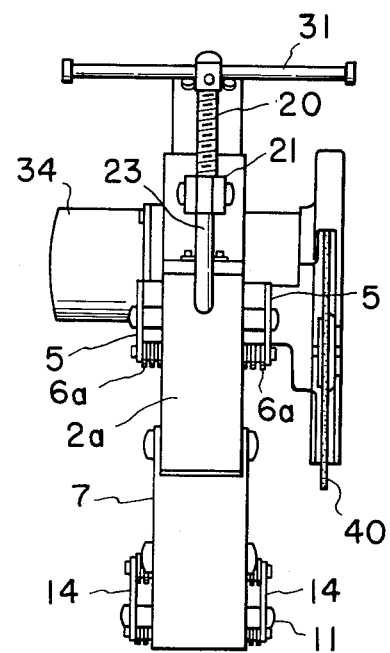
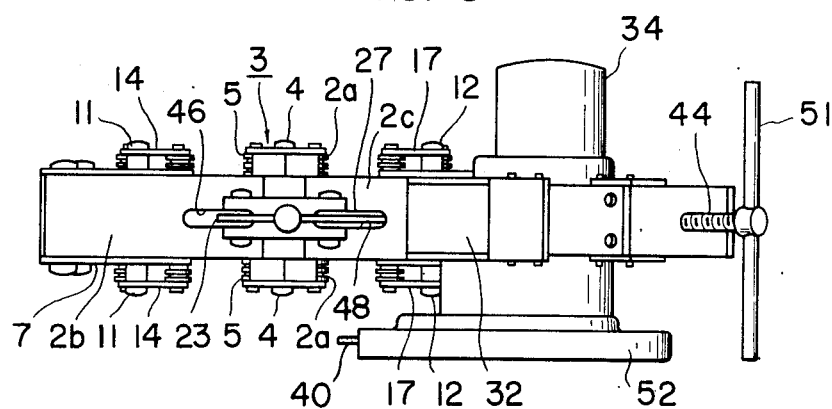

PIPE PROCESSING DEVICE

BACKGROUND OF THE INVENTION

This invention relates to a pipe processing device, which is used for cutting and/or chamfering a pipe.

Generally, in chamfering or beveling the end of the pipe on the pipe assembly works, there has been used portable grinding means and accordingly the chamfering works were troublesome and took a long time for finishing, and on the other hand, there has been used processing by lathe in which the pipe cut in a predetermined length is set on the lathe and the end surface of said pipe is chamfered by means of a cutting tool, which was also troublesome and inferior to working efficiency. Further, there is a pipe cutting device proposed for similar purpose, as shown in the Official Gazette of Japanese Patent Publn. No. 23727/1981 which discloses that the chain with rollers for attaching a cutter is wound around the pipe to be cut and then rotated adjusting the locus of the cutter edge so as to meet the starting point and the finishing point of the cutting line. By these operations, the pipe is vertically cut and if necessary the end surface of the pipe is chamfered. However, the disclosed work has the drawbacks such that the chain wound around the pipe has to be connected in the endless state by means of a joint ring to apply a strong tension thereto; and that the cutter has to be rotated by engaging the sprocket for driving the cutting device with the chain, which required skilled works and took a considerable time.

SUMMARY OF THE INVENTION

This invention is to provide a pipe processing device for use in cutting and/or chamfering or beveling a pipe to be welded.

The object of this invention is to provide the pipe processing device which can cut a pipe by means of a cutting wheel vertically for the axial line.

Another object of this invention is to provide the pipe processing device which can chamfer or beveling the end surface of the pipe by means of a chamfering cutter mounted on the device.

Further object of this invention is that the pipe assembly can be effected with the higher efficiency by using the pipe processing device according to this invention.

Still further object of this invention is that the pipe processing device can cut effectively the pipe having a large diameter of about more than 15 inches (about 38 cm) vertically for the axial line.

Still another object of this invention is that the pipe processing device can chamfer or bevel effectively the end of the pipe having a large diameter of about more than 15 inches (about 38 cm).

BRIEF DESCRIPTION OF THE DRAWINGS

FIG. 3 is a right side elevation of the same;

FIG. 4 is a left side elevation of the same;

FIG. 5 is a plan view of the same;

DETAILED DESCRIPTION OF THE INVENTION

Figure 1:
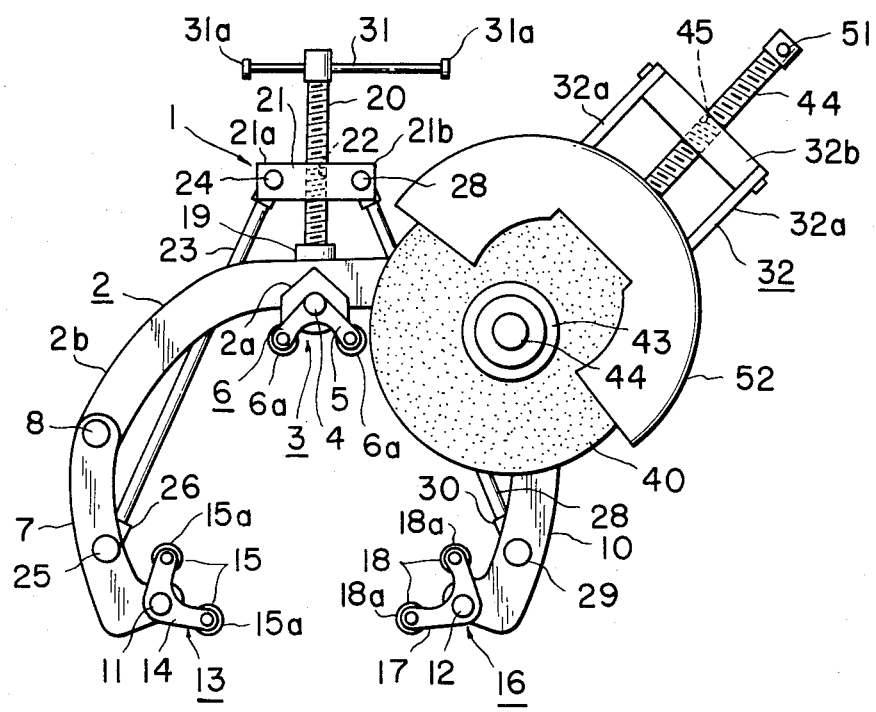
FIG. 1 is a front view of a pipe processing device according to the present invention.

An example of the present invention will now be described referring to the accompanying drawings.

Referring to FIG. 1 through FIG. 7, the attaching body 1 has a supporting member 2 of which both side portions are formed downwardly. An upper abutting member 3 is fixed to the mounting portion 2a through a supporting shaft 4, said mounting portion being formed at the central portion of the supporting member 2. The upper abutting member 3 is provided with a pair of holding members 5,5 which are fixed at the corner portion thereof to the supporting shaft 4, said holding members having respectively the angle shape of which both sides are the same length. An abutting roller 6a is respectively provided at the end portions in both sides of a pair of holding members 5,5 so that each roller may be rotatable in the parallel state. In other words, the upper abutting member 3 is provided with an contacting member 6 having a pair of parallel abutting rollers 6a, 6a. The base portion of a left arm member 7 is rotatably attached to the end portion of the left half portion 2b of the supporting member 2 through a shaft 8, and similarly the base portion of a right arm member 9 is rotatably attached to the end portion of the right half portion 2c of the supporting member 2 through a shaft 10. A supporting shaft 11 is rotatably provided at the free end portion of the left arm member 7, and similarly a supporting shaft 12 the rotatably provided at the free end portion of the right arm member 9.

Figure 2:
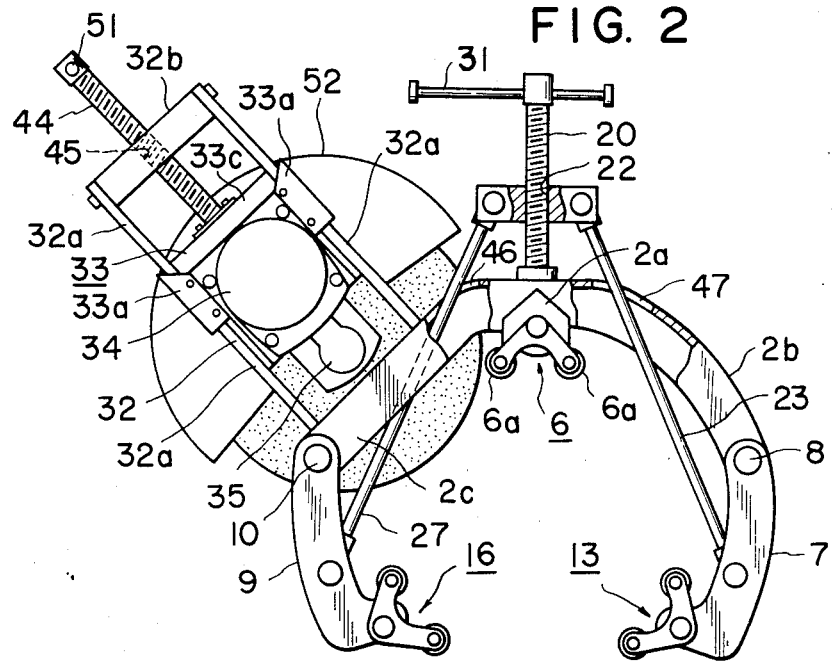
FIG. 2 is a rear view of the same.
Figure 6:
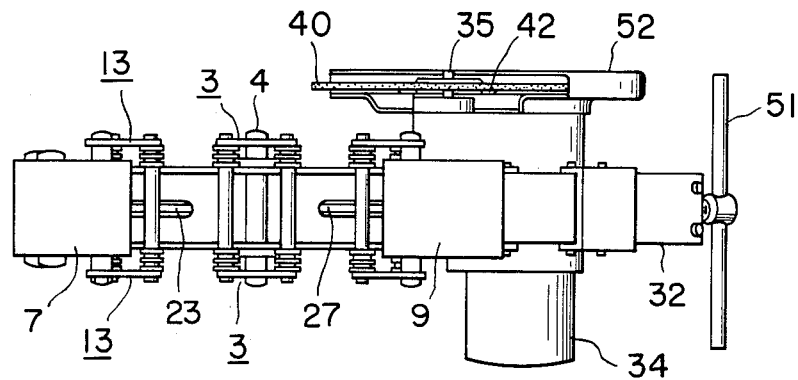
FIG. 6 is a bottom view of the same.

As is best shown in FIGS. 1 and 2, the left abutting member 13 is provided with a pair of holding members 14,14 which are fixed at the corner portion thereof to the supporting shaft 11, said holding members having respectively the angle shape of which both sides are the same length. An abutting roller 15a is respectively provided at the end portion in both sides of a pair of holding members 14,14 so that each roller may be rotatable in the parallel state. In other words, the left abutting member 13 is provided with an contacting member 15 having a pair of parallel abutting rollers 15a, 15a, the left abutting member 13 being singable to the supporting shaft 11.

Similarly, the right abutting member 16 is provided with a pair of holding members 17,17 which are fixed at the corner portion thereof to the supporting shaft 12, said holding members having respectively the angle shape of which both sides are the same length. An abutting roller 18a is respectively provided at the end portion in both sides of a pair of holding members 17,17 so that each roller may be rotatable in the parallel state. In other words, the right abutting member 16 is provided with an contacting member 18 having a pair of parallel abutting rollers 18a,18a being singable to the supporting shaft 12.

Referring to FIG. 1, a base member 19 is fixed at the upper surface in the central portion of the supporting member 2. A screw bar 20 is rotatably mounted on said base member 19 at its lower end portion. A mounting member 21 is engaged with the screw bar 20 through its screw hole 22. Accordingly, the mounting member 21 is moved upwardly or downwardly by turning of the screw bar 20. The upper end of a left tension bar 23 is pivotally attached to the left end portion 21a of the mounting member 21 through a shaft 24. The lower end of the left tension bar 23 is pivotally attached to a shaft 25 which is provided in the lower portion of the left arm member 7 through a connecting member 26.

Similarly, the upper end of a right tension bar 27 is pivotally attached to the right end portion 21b of the mounting member 21 through a shaft 28. The lower end of the right tension bar 27 is pivotally attached to a shaft 29 which is provided in the lower portion of the right arm member 9 through a connecting member 30.

The bar portion of a bar handle 31 is loosely passed through a horizontal hole formed in the top portion at the upper end of the screw bar 20, which makes easy to rotate the screw bar 20 through the bar handle 31. Pieces 31a,31a for preventing falling-off are provided on both ends of the bar handle 31.

Referring to FIG. 2, a guide member 32 is fixed on the right half portion 2c of the supporting member 2 at the lower end portion thereof, said guide member 32 being in the frame shape and extended to the diagonal and upward direction in the left hand.

Figure 9:
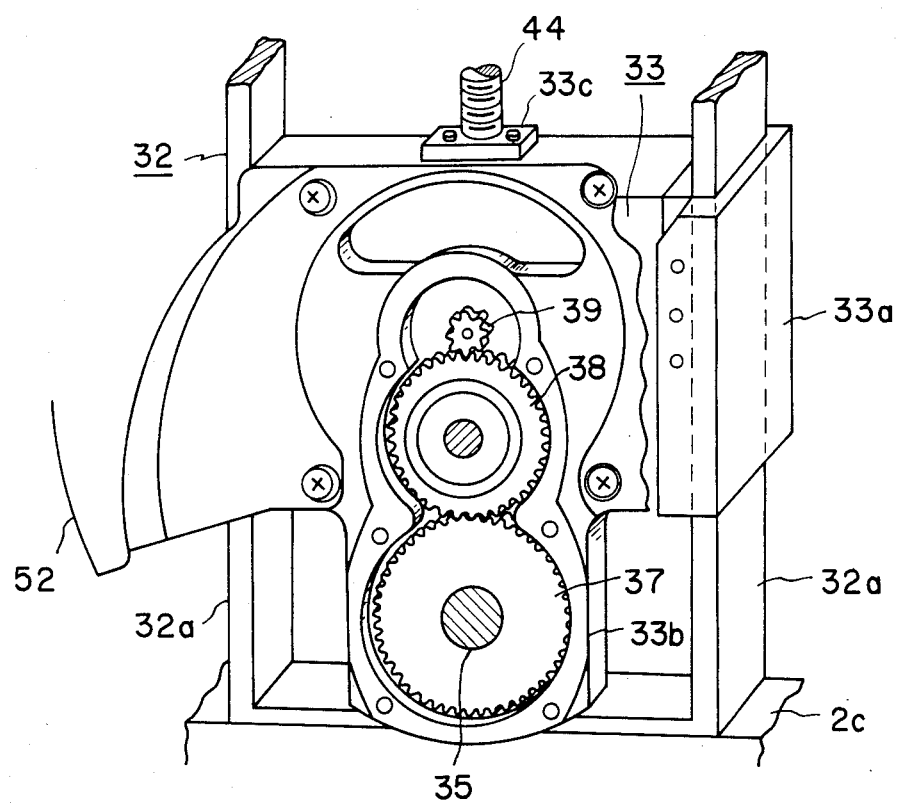
FIG. 9 is an enlarged view showing a relative construction among a guide member, a movable member and a driving mechanism for a rotating shaft.

Referring to FIG. 9, a movable member 33 is mounted on the guide member 32, in which a holding portion 33a of the movable member 33 is slidably fitted to the column portion 32a of the guide member 32.

As shown in FIG. 2 through FIG. 6, a motor 34 is provided on the rear side of the movable member 33.

Figure 10:
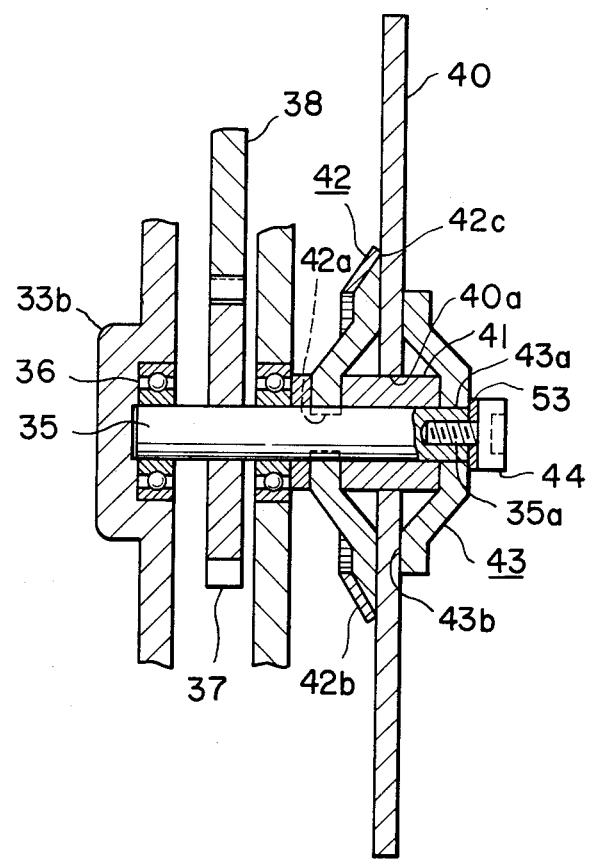
FIG. 10 is a sectional view of the enlarged essential parts in the present invention, which shows the state that the cutting wheel and the chamfering cutter are attached to the rotating shaft.

Referring to FIG. 9 and FIG. 10, a rotating shaft 35 is supported by a bearing 36 provided inside of the shaft supporting portion 33b formed on the lower portion of the movable member 33. A gear train is so formed that a gear 37 fixed on the rotating shaft 35 is engaged with an intermediate gear 38 engaged with a gear 39 fixed on the shaft of the motor 34. A cutting wheel 40 as a cutting-off grinding wheel having a circular plate shape is fitted at its central hole 40a to a cylindrical spacer 41 mounted on the rotating shaft 35. A chamfering cutter 42 is fitted at its central hole 42a to the rotating shaft 35, said chamfering cutter 42 has a dish shape made of high speed steel having a cutter portion 42b formed on its peripheral edge. A contacting surface 42c of the chamfering cutter 42 is contacted with a inside surface of the cutting wheel 40. A press contacting member 43 is fitted at its central hole 43a to the rotating shaft 35. A contacting surface 43b of the press contacting member 43 is contacted with the outside surface of the cutting wheel 40. A screw bar 44 is fitted into the threaded portion 35a of the rotating shaft 35. The both sides of the cutting wheel 40 are held by the chamfering cutter 42 and press contacting member 43. The cutting wheel 40, the chamfering cutter 42 and the press contacting member 43 may be rotated together with the rotating shaft 35. In this case, the cutting wheel 40, the chamfering cutter 42 and the rotating shaft 35 have a common axial line.

Figure 7:
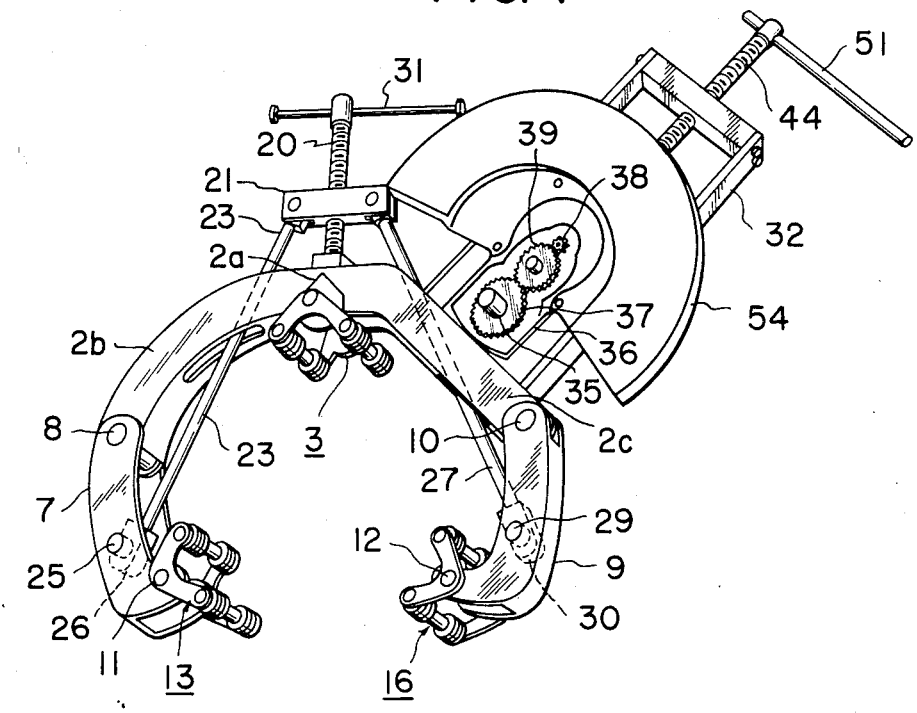
FIG. 7 is a perspective view of essential parts in the present invention, in which a cutting wheel, a part of the cutting wheel cover and a chamfering cutter are omitted.
Figure 8:
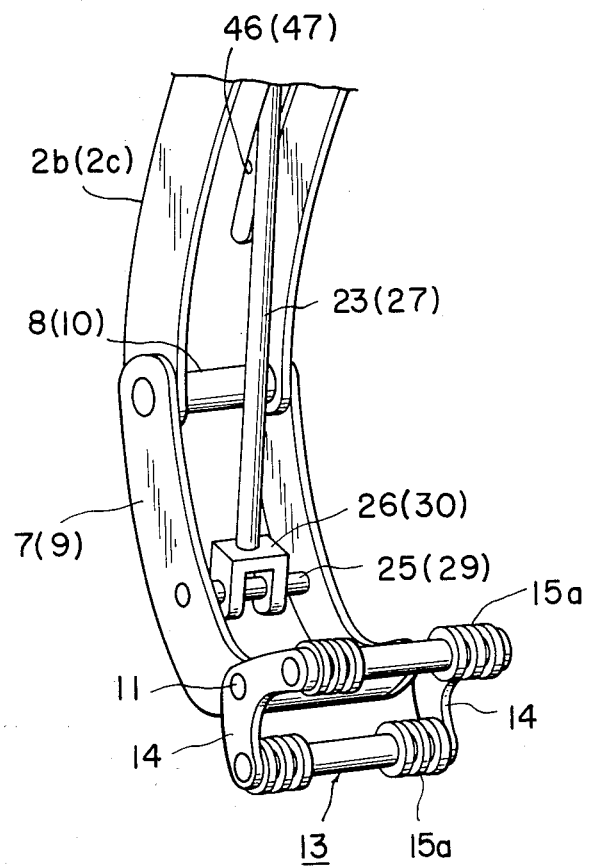
FIG. 8 is an enlarged view showing a relative construction among a left arm member, a left tension bar and a left abutting member in the present invention.

Referring to FIG. 2 and FIG. 7, lower end portion of a screw bar 44 is pivoted on the mounting portion 33c of the movable member 33, said screw bar 44 being fitted into a screw hole 45 formed on the beam portion 32b of the guide member 32. The movable member 33 is capable of advancing or retracting movement along the guide member 32 by rotating the screw bar 44.

In the embodiment, the supporting member 2 has the downwardly curved shape in view from the front and its section has the inwardly curved U-shape. The upper portion of the left arm member 7 is fitted into the left half portion 2b of the supporting member 2 and is connected swingably by means of the shaft 8. The lower end portion of the left tension bar 23 is fixed on the connecting member 26 mounted rotatably on the shaft 25. The intermediate portion of the left tension bar 23 is inserted into a slot 46 formed on the left portion 2b of the supporting member 2. The upper portion of the right arm member 9 is fitted into the right half portion 2c of the supporting member 2 and is connected swingably by means of the shaft 10. The lower end portion of the right tension bar 27 is fixed on the connecting member 30 mounted rotatably on the shaft 29. The intermediate portion of the right tension bar 27 is inserted into a slot 47 formed on the right half portion 2c of the supporting member 2.

Figure 11:
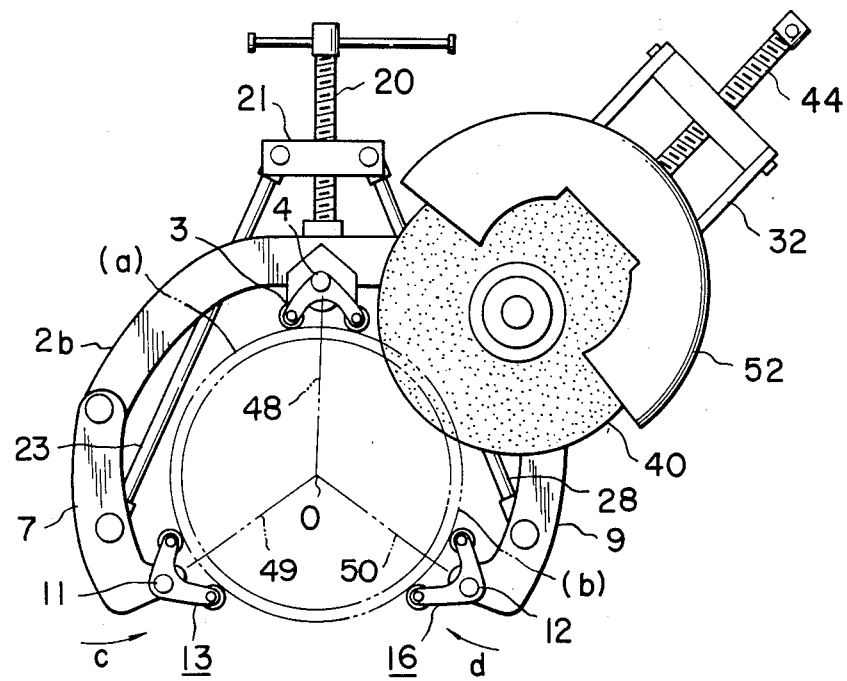
FIG. 11 is a view explaining the state of use of the present invention, in which the pipe processing device is cutting as pipe by means of the cutting wheel.

As shown in FIG. 11, the upper abutting member 3, the left abutting member 13 and the right abutting member 16 have the same shape and same size.

The center of each of rollers 6a,6a in the contacting member 6 is positioned in the same distance from the center of the supporting shaft 4, similarly, the center of each of rollers 15a,15a in the contacting member 15 is positioned in the same distance from the center of the supporting shaft 11, also similarly, the center each of abutting rollers 18a,18a in the contacting member 18 is positioned in the same distance from the center of the supporting shaft 12.

Referring to FIG. 11 as viewed in front elevation, the left abutting member 13 is situated on the left side with respect to the downward extension of the center line in supporting shaft 4 of the upper abutting member 3, and the right abutting member 16 is situated on the right side.

When the upper abutting member 3, the left abutting member 13 and the right abutting member 16 are abutted on the outer periphery of the pipe a by means of the left arm member 7, the right arm member 9 the left tension bar 23 and the right tension bar 27 in accordance with the upwardly movement of the mounting member 21.

An extension line 48 of the vertical center line of the supporting shaft 4, the extension line 49 of the center line of the supporting shaft 11, and the extension line 50 of the center line of the supporting shaft 12 are designed to maintain spacing of 120° with one another with the point of intersection O as the center.

The spacing of 120° will be unchanged in accordance with the state of expansion between the left arm member 7 and the right arm member 9.

The left abutting member 13 and the right abutting member 16 are respectively swingable at each of the supporting shafts 11,12. The upper abutting member 3 is fixed on the mounting portion 2a of the supporting member 2 via the supporting shaft 4. A pair of parallel abutting rollers 6a,6a are located as if the line connected between the centers of said abutting rollers 6a,6a were on the horizontal line. Accordingly, the vertical line started from the center of the supporting shaft 4 crosses at the middle point of the line connected between the centers of said rollers 6a,6a. Further, said abutting rollers 6a,6a are located symmetrically with respect to the axial line of the screw bar 20.

A bar handle 51 is mounted at the upper end of the screw bar 44. In the drawings, the reference number 52 is the cover of the cutting wheel 40, the reference number 53 is a washer, and the abutting rollers 6a,6a, 15a,15a and 18a,18a may be replaced by bearing rollers.

The pipe processing device according to the present invention being constructed as described above, the mounting member 21 is moved downwardly by rotating the screw bar 20 by means of the bar handle 31, and as a result, the left tension bar 23 and the right tension bar 27 are moved downwardly and then the left arm member 7 and the right arm member 9 are moved outwardly. After the state as mentioned above, the upper abutting member 3, the left abutting member 13 and the right abutting member 16 are made to approach toward the outer peripheral surface b of the pipe a.

Nextly, the mounting member 21 is moved upwardly by rotating the screw bar 20 by means of the bar handle 31, and as a result, the left tension bar 23 and the right tension bar 27 are moved upwardly and at the same time the left arm member 7 and the right arm member 9 are pulled up so as to hold the pipe a, thereby to press-contact the upper abutting member 3, left abutting member 13 and the right abutting member 16 to the outer peripheral surface of the pipe a. Consequently, the attaching body 1 is set to the pipe a.

As shown in FIG. 11, when the attaching body 1 is set to the pipe a, the middle points between the abutting rollers 6a and 6a, 15a and 15a, and 18a and 18a are located as if these middle points corresponded to each of three apexes of a regular triangle, and this condition is always maintained in the different size of pipes also.

The left abutting member 13 and the right abutting member 16 are moved at the same time in such a manner that by abutting the upper abutting member 3 to the top portion of the peripheral surface of the pipe a and then by rotating the screw bar 20, said left abutting member 13 is so moved as to embrace the pipe toward the center of the pipe from the left lower side thereof, as shown with arrow c, and similarly said right abutting member 16 is so moved as to embrace the pipe toward the center of the pipe from the right lower side thereof as shown with arrow d.

The left abutting member 13 and the right abutting member 16 operate with the swingable motion so that each of the abutting rollers 15a,15a and 18a,18a can press-contact completely to the outer peripheral surface b of the pipe a, thereby to securely hold the pipe.

Nextly, by operating a motor 34, the rotating shaft 35 is rotated through the gears 37,38 and 39 and at the same time the cutting wheel 40 and the chamfering cutter 42 are rotated at a high speed.

Figure 12:
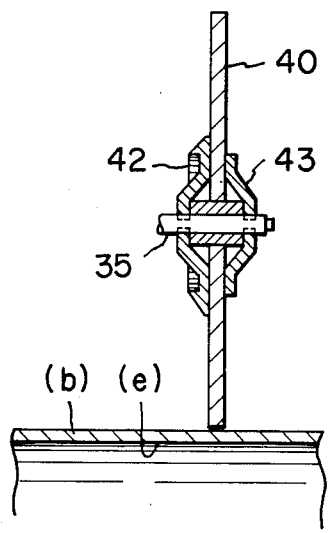
FIG. 12 is a view explaining with a sectional view the process of cutting a pipe by means of the cutting wheel.

Referring to FIG. 12, the cutting wheel 40 is abut to the outer peripheral surface b of the pipe a by advancing the movable member 33 by means of the screw bar 44 which is rotated by the bar handle 51 to confirm the cutting position, and then the cutting wheel 40 shafts to partially cut the pipe from the outer peripheral surface b into the inner peripheral surface e by further advancing the movable member 33 by means of the screw bar 44. After the above operation, the attaching body 1 is smoothly moved manually along the outer peripheral surface b of the pipe a by rotating the abutting rollers 6a,6a and 15a,15a and 18a,18a and as a result, the pipe can be cut completely by the cutting wheel 40 which travels round the pipe one time.

Figure 13:
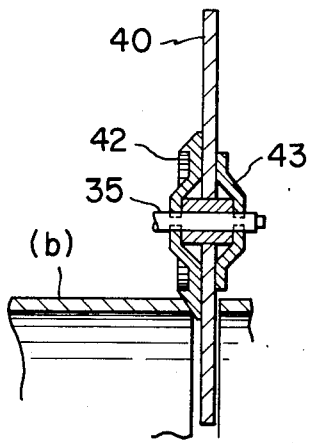
FIG. 13 is a view explaining with a sectional view the process of chamfering the end of a pipe by means of the chamfering cutter.
Figure 14:
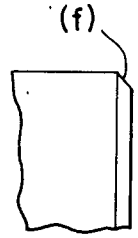
FIG. 14 is a partial view of the chamfered end of a pipe.
Figure 15:
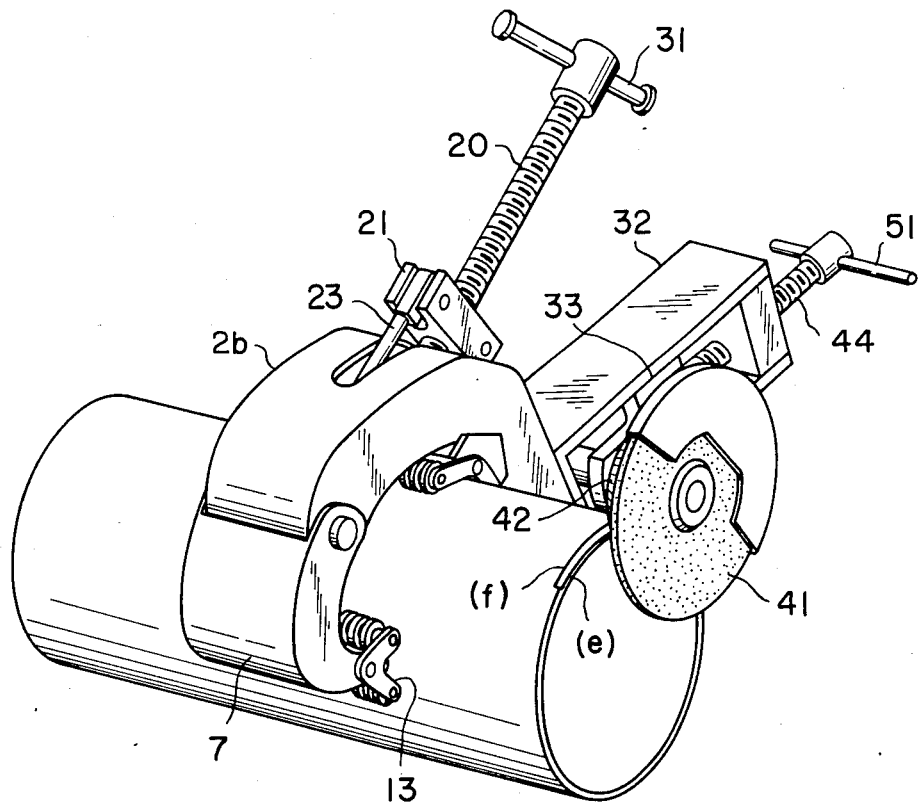
FIG. 15 is a view explaining the state of use of the present invention, in which the pipe processing device is chamfering the end of a pipe by means of a chamfering cutter, applying an attaching body to a pipe.

The chamfering cutter 42 is applied to the outer peripheral surface b of the end portion of the pipe cut by means of the cutting wheel 40 and then it is operated so that the chamfering can be carried out at a predetermined angle, as shown in FIG. 13. As a result, the chamfering having a predetermined angle can be completely made on the end portion of the pipe a by the chamfering cutter 42 which travels round the pipe a one time, together with the attaching body 1.

As the attaching body 1 is set securely on the pipe a by means of the upper abutting member 3, the left abutting member 13 and the right abutting member 16, the attaching body 1 can travel round the pipe a smoothly along the outer peripheral surface b of the pipe a, even when a strong repulsion is produced during the cutting or the chamfering of the pipe.

In this embodiment, there is shown the upper abutting member 3, in which the supporting shaft 4 is fixed to the mounting portion 2a of the supporting member 2, the holding members 5,5 are fixed to said supporting shaft 4, and a pair of rollers 6a,6a are provided in parallel to the holding members 5,5. However, it is possible to substitute said upper abutting member 3 by a swingable upper abutting member which is movable at the supporting shaft 4.

The pipe processing device according to the present invention can be used only in the case of cutting the pipe or only in the case of chamfering of the end portion of the pipe.

In the pipe processing device according to the present invention, the setting state of the device to the pipe is stabilized, as three middle points between a pair of parallel abutting rollers in each of the upper abutting member, the left abutting member and the right abutting member are in the position as if a regular triangle were always shaped by connecting each of said middle points regardless of the size of a pipe and also the left abutting member and the right abutting member are swingable to make the setting state of the device to the pipe easy.

Further, even when a strong repulsion is produced during the cutting of a pipe by the cutting wheel or during the chamfering by the chamfering cutter, the attaching body can travel smoothly round the pipe.

Furthermore, the device according to the present invention has the very wide range of application to the sizes of the pipes, and in particular the application to the pipe having large diameter more than 15 inches (about 38 cm) is effective.

In addition, when the device according to the present invention is used to edge preparation in the case of welding end portions of pipes, the working efficiency is remarkably increased.

What is claimed is:

1. Pipe processing device provided with an attaching body which comprises a supporting member, an upper abutting member provided at the central portion of said supporting member and having a pair of parallel abutting rollers, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers, a right abutting member provided at the free end portion of said right arm member and having a pair of parallel abutting rollers, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member; a movable member provided on said guide member, said movable member being capable of advancing and retracting along said guide member; a rotating shaft provided on said movable member; and a cutting wheel and a chamfering cutter provided on said rotating shaft.

2. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member; a movable member provided on said guide member, said movable member being capable of advancing and retracting along said guide member; a rotating shaft provided on said movable member; and a cutting wheel and a chamfering cutter provided on said rotating shaft.

3. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member, said guide member being in the frame shape and extended to the diagonal and upward direction; a movable member provided on said guide member, said movable member being capable of advancing and retracting along said guide member; a screw bar provided on the mounting portion of said movable member; a motor provided on the rear side of said movable member; a rotating shaft provided on said movable member, said rotating shaft being rotatable by the driving mechanism driven by said motor; and a cutting wheel and a chamfering cutter provided on said rotating shaft.

4. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member, said guide member being in the frame shape and extended to the diagonal and upward direction; a movable member provided on said guide member, said movable member being capable of advancing and retracting along said guide member; a screw bar provided on the mounting portion of said movable member; a motor provided on the rear side of said movable member; a rotating shaft provided on said movable member, said rotating shaft being rotatable by the driving mechanism driven by said motor; and a cutting-off grinding wheel and a high speed steel chamfering cutter provided on said rotating shaft.

5. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member, said guide member being in the frame shape and extended to the diagonal and upward direction; a movable member provided on said guide member, said movable member being capable of advancing and retracting along said guide member; a screw bar provided on the mounting portion of said movable member; a motor provided on the rear side of said movable member; a rotating shaft provided on said movable member, said rotating shaft being rotatable by the driving mechanism driven by said motor; and a cutting-off grinding wheel and a high speed steel chamfering cutter provided on said rotating shaft, said chamfering cutter being in contact with an inside surface of said cutting-off grinding wheel.

6. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member, said guide member being in the frame shape and extended to the diagonal and upward direction; a movable member provided on said guide member, said movable member being capable of advancing and retracting along said guide member; a screw bar provided on the mounting portion of said movable member; a motor provided on the rear side of said movable member; a rotating shaft provided on said movable member, said rotating shaft being rotatable by the driving mechanism driven by said motor; a cutting-off grinding wheel provided on said rotating shaft; a high speed steel dish-shape chamfering cutter provided on said rotating shaft, said chamfering cutter being in contact with an inside surface of said cutting-off grinding wheel with a common axial line; and a press contacting member provided in contact with the outside surface of said cutting-off grinding wheel.

7. Pipe processing device provided with an attaching body which comprises a supporting member having both side portions formed downwardly, an upper abutting member provided at the central portion of said supporting member and having a pair of parallel abutting rollers mounted on the holding member, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers mounted on the holding member, a right abutting member provided at the free end portion of said right arm member and having a pair of parallel abutting rollers mounted on the holding member, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member; a guide member fixed to said supporting member, said guide member being in the frame shape and extended to the diagonal and upward direction; a movable member provided on said guide member, said movable member being capable of advancing and retracting along said guide member; a screw bar provided on the mounting portion of said movable member; a motor provided on the rear side of said movable member; a rotating shaft provided on said movable member, said rotating shaft being rotatable by the driving mechanism driven by said motor; a cutting-off grinding wheel provided on said rotating shaft; a high speed steel dish-shape chamfering cutter provided on said rotating shaft, said chamfering cutter being in contact with an inside surface of said cutting-off grinding wheel with a common axial line and having a peripheral edge cutting portion with a predetermined angle; and press contacting member provided in contact with the outside surface of said cutting-off grinding wheel.

8. Attaching body which comprises a supporting member, an upper abutting member provided at the central portion of said supporting member and having a pair of parallel abutting rollers, a left arm member pivotally attached at its base portion to the left half portion of said supporting member, a right arm member pivotally attached at its base portion to the right half portion of said supporting member, a left abutting member provided at the free end portion of said left arm member and having a pair of parallel abutting rollers, a right abutting member provided at the free end portion of said right arm member and having a pair of parallel abutting rollers, a screw bar pivotally supported at its lower end portion on said supporting member, a mounting member screw-fitted to said screw bar, a left tension bar pivotally attached at its upper end portion to the left end portion of said mounting member and also pivotally attached at its lower end portion to the left arm member, and a right tension bar pivotally attached at its upper end portion to the right end portion of said mounting member and also pivotally attached at its lower end portion to the right arm member.

* * * * *